Figure 1:
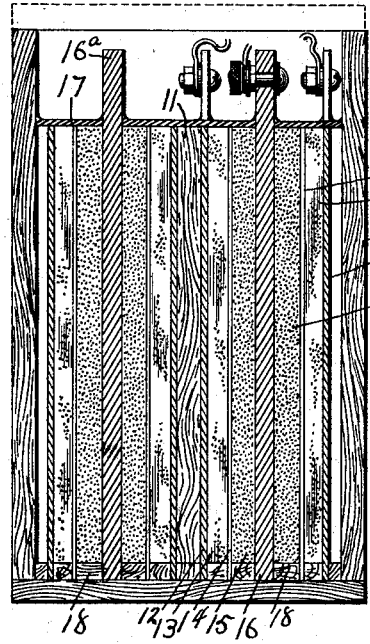

No. 757,422. PATENTED APR. 12, 1904.
A. F. SWAN & A. W. ROSE.
DRY BATTERY.
APPLICATION FILED JULY 22, 1903.

NO MODEL.

WITNESSES:
Abraham B. Cox, Jr.
John T. Carolan

INVENTORS.
Alfred F. Swan, and
Allen W. Rose.
BY W. B. Hutchinson,
ATTORNEY.

No. 757,422.                                                    Patented April 12, 1904.

UNITED STATES PATENT OFFICE.

ALFRED F. SWAN, OF BAYONNE, NEW JERSEY, AND ALLEN W. ROSE, OF NEW YORK, N. Y., ASSIGNORS OF ONE-HALF TO PATENT DEVELOPMENT COMPANY OF AMERICA, OF NEW YORK, N. Y., A CORPORATION OF NEW YORK.

DRY BATTERY.

SPECIFICATION forming part of Letters Patent No. 757,422, dated April 12, 1904.

Application filed July 22, 1903. Serial No. 166,518. (No model.)

*To all whom it may concern:*

Be it known that we, ALFRED F. SWAN, of Bayonne, Hudson county, and State of New Jersey, and ALLEN W. ROSE, of the city, county, and State of New York, have invented a new and Improved Dry Battery, of which the following is a full, clear, and exact description.

Our invention relates to improvements in dry batteries; and the object of our invention is to produce a cheap, simple, and particularly compact battery, the primary idea being to get the comparatively large number of cells in the smallest possible space, to the end that the battery may be conveniently used for many purposes where it would be inconvenient to use the same number of cells when constructed in the ordinary manner.

For many purposes—such, for instance, as running an electric fan or a sparker for gas-engines—it is inconvenient to assemble a sufficient quantity of ordinary independent cells, because they are bulky and easily displaced, and for these and other uses we have provided a battery in which the large number of cells are arranged compactly in a single case and form practically a single battery. With these ends in view instead of using the ordinary cylindrical structure we make a case which is preferably rectangular and have the battery elements all in parallel relation and preferably forming a series of transverse partitions across the case. This arrangement, it will be observed, makes it possible to bring the terminals of the battery elements into very close connection, so that by a simple switch it is very easy to shift the connection of the elements—that is to say, if a zinc or pair of zinc elements are in connection with a carbon it is a simple matter to switch over, so that other zinc elements will be cut in and the original ones cut out, so that the first-mentioned elements can have opportunity to recuperate. Another advantage of this form of structure is that it is easily handled and is especially strong, all of which will appear from the description to follow.

With these ends in view our invention consists of certain features of construction and combinations of parts, which will be hereinafter described and claimed.

Reference is to be had to the accompanying drawings, forming part of this specification, in which similar letters and figures of reference indicate corresponding parts in all the views.

Figure 2:
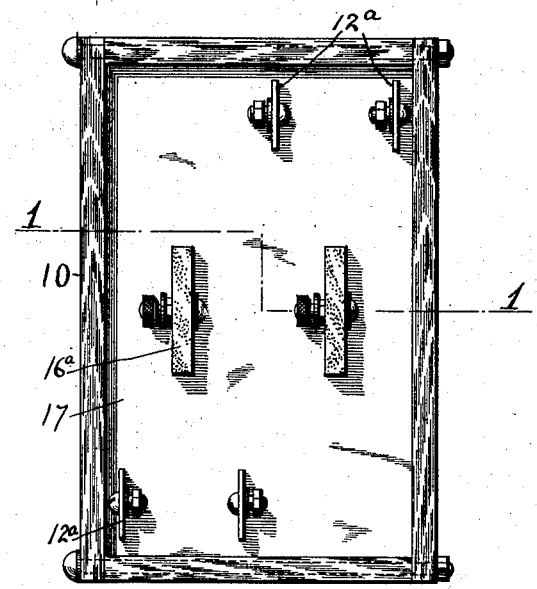
Figure 3:
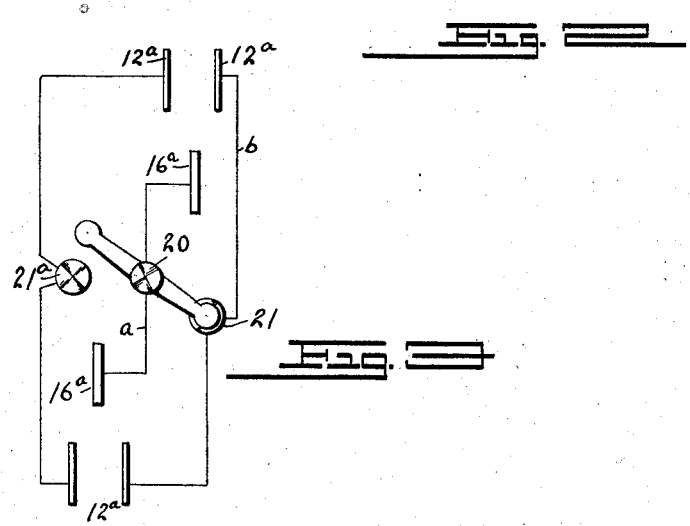

Figure 1 is a vertical cross-section on line 1 1 of Fig. 2 of our improved battery. Fig. 2 is a plan view of the battery, and Fig. 3 is a diagram of a switching arrangement which can be used.

In carrying out our invention we make a case 10, preferably of wood and rectangular, though the material can of course be varied, and the case can be provided with a suitable lid or cover, as shown by dotted lines in Fig. 1. This case is divided by a vertical partition 11 to form two cells; but it is clear that any number of partitions may be used to form any required number of cells. The elements of the battery are preferably straight and are placed in parallel relation, and obviously the same result is attained as if the ordinary cylindrical forms were used; but the battery is much more compact and stronger if it is made to comprise a plurality of cells. In carrying out this idea, beginning at the right in Fig. 1, we use a zinc element 12, which extends entirely across the case and has a terminal or connecting lug $12^a$, having the usual binding-screw connection and extending above the normal level of the battery. Next to the zinc comes a layer of plaster-of-paris 13 and then a partition of pasteboard 14 or other similar substance which will keep the plaster from actual contact with the active material 15, which is of any usual kind and fills the space between the cardboard 14 and the carbon element 16. This carbon element forms also a partition in the case and extends entirely across the case. It has an upwardly-projecting connecting-terminal $16^a$, having the usual binding-screw attachment. On the other or second side of the carbon is another layer of active material 15, then another layer of cardboard or pasteboard 14, then another layer of plaster-of-paris 13, and finally another zinc element 12, which lies next to the partition 11. The second cell is exactly like the first and needs no description, and obviously any number of cells can be provided in this manner.

It will be seen that the carbon element forms a partition extending entirely across the case, with the active material on both sides of it, and that the arrangement shown provides for any required amount of surface.

We do not claim that the battery is broadly new in principle; but the structure shown gives so great surface, great compactness, and as much efficiency per cell as a battery of the ordinary type. To make the battery still more rigid, strips 18 are fitted between the several elements and parts, as shown in Fig. 1, and to prevent evaporation and displacement the top of the battery is incased, as usual, with a layer of pitch or coal tar 17 or other suitable binding material.

Referring to Fig. 2, it will be seen how easy it is to shift the connections so as to permit the zinc elements to pick up or recuperate after they are weakened. Supposing one of the zinc connections $12^a$ at the top of the figure to be connected with the right-hand carbon terminal $16^a$, it is a very simple matter to shift the connection from one of the zinc terminals to the other. It will also be observed that all the elements of the battery can be used together for a purpose where considerable power is required and that the same idea can be conveniently carried out even though a larger number of cells were used. For instance, in making a battery for running an ordinary electric fan we should use about twenty cells, which would all be combined in the compact rectangular case, and for making the proper connections a switch of any suitable form can be conveniently adapted to the lid of the battery-case. In Fig. 3 we show diagrammatically how this can be easily done. Here a switch-arm 19 is pivoted on a center 20, which connects with the carbon terminal 16 through the wire $a$, while the switch-arm is also adapted to contact with the contact-points 21 and $21^a$, connecting, respectively, by wires $b$ and $b'$ with couples of the zinc elements. Thus by turning the switch into contact with the point 21 two of the zinc elements are cut into circuit with a carbon element, while by turning the switch into contact with the point $21^a$ the first-mentioned zincs are cut out and the others cut in.

We wish to call attention to the fact that this type of battery, while being compact and strong, is very easily made and the parts conveniently assembled.

Attention is further called to the fact that the carbon in each cell makes a division which in reality converts the cell into a double cell or two cells, so that the drawings, as shown, really comprise four cells instead of two, as might be understood in view of the partition 11.

Having thus fully described our invention, what we claim as new, and desire to secure by Letters Patent, is—

1. In a battery, the combination of a casing, a negative element and two separated positive elements therein, active material interposed between the negative element and the positive elements, and a switch device and connections whereby the positive elements may be alternately switched into circuit with the negative element so that each positive element may be allowed to recuperate while the other is being used.

2. A battery of the kind described, comprising a case with the zinc and carbon elements extending entirely across the case, the carbon forming a transverse partition in the case and carrying active material on both sides of it.

3. A battery of the kind described, comprising a case forming a cell, a carbon element extending entirely across the case, and dividing the cell into two parts so as to carry active material on each side of the carbon, and zinc elements suitably separated from the carbon and the active material and extending also across the case.

4. In a battery, the combination of a casing, a pair of cells therein each consisting of a negative element and two separated positive elements, active material interposed between the positive elements and the negative element and a switch device and connections whereby the positive elements of each cell may be alternately switched into circuit with both the negative elements.

5. A battery comprising a rectangular case having transverse partitions to form a series of cells, a carbon element extending entirely across each cell, and dividing the same into two cells, a plurality of zinc elements held in each division of the case and in parallel relation with the carbon, means for holding the active material on each side of the carbon, and suitable separating matter interposed between the active material and the zincs.

ALFRED F. SWAN.
ALLEN W. ROSE.

Witnesses:
W. B. HUTCHINSON,
J. G. DUNBAR.